Patented Sept. 16, 1924.

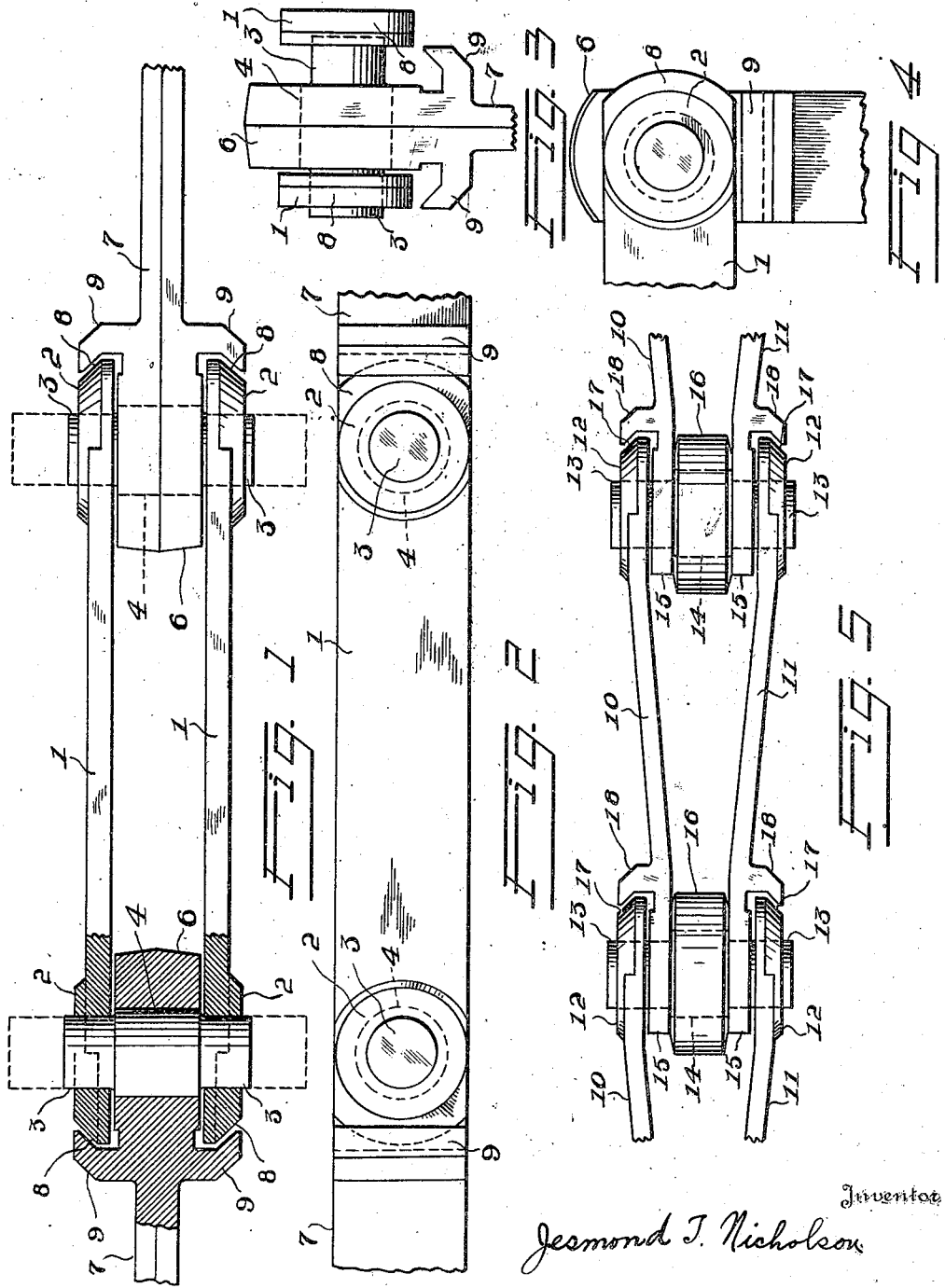

1,508,854

UNITED STATES PATENT OFFICE.

JESMOND T. NICHOLSON, OF WILKES-BARRE, PENNSYLVANIA.

DETACHABLE CHAIN.

Application filed January 17, 1924. Serial No. 686,833.

*To all whom it may concern:*

Be it known that I, JESMOND T. NICHOLSON, a citizen of the United States, residing at Wilkes-Barre, in the county of Luzerne and State of Pennsylvania, have invented certain new and useful Improvements in Detachable Chains, of which the following is a specification.

This invention relates to improved detachable chains which may be rapidly built up and taken apart, such for example as are utilized in conveying, scraping, excavating and like machinery.

More particularly the invention relates to chains for more or less heavy duty flight and scraper, conveying and like machinery, which in operation is driven and supported by toothed sprockets. In coal, ore and other mining operations, and in excavating, handling and storing materials of all kinds, great quantities of conveyor chain are utilized. Inasmuch as these chains are commonly driven by the toothed sprocket wheels, the pitch of the links is limited in length to the practicable range of the pitch of the sprocket teeth, and in this way the chain links are limited to relatively short lengths. In operations where such chains are utilized, particularly in mining and storing operations, great lengths of such chains are utilized to convey materials long distances. The heavy demands in service result in rapid wear at each of the numerous link joints of the chains heretofore commonly in use, with the result that constant attention and frequent adjustment thereof is necessary, until in a short time the parts become so worn as to require replacements. The cost of proper maintenance of such chains is high and the useful life thereof is short. Various forms of chains have been proposed in which detachable links are utilized and held together by pintles or pins with lugs or flat places formed thereon to lock or hold the chain in assembled relation. Such chains are subject to serious wear on the pintles due to the fact that they are not free to turn in the links, but are constrained to remain in fixed position due to the lugs or flattened surfaces mentioned. The wear in such chains is all thrown on fixed surfaces of the pins. A further disadvantage of such chains is that the pintles are of such structure as to preclude a careful fitting of the joints, such as is possible with turned pins and drilled holes. This lack of initial fit initially throws all the wear on relatively small supporting areas with consequent greater unit pressures and more rapid wear of bearing parts. The depressions or lugs on the pintles are subjected to rapid wear and rusting, and such pins must be frequently replaced. The links of such prior chains have been complicated in structure and expensive due to the fact that special provision must be made to cooperate with the specially constructed pins.

An object of the present invention is the provision of a more simple, efficient and durable detachable chain structure than has been heretofore produced.

Another object of the invention is the provision of a detachable chain structure in which all holes or perforations in the links necessary for assembling and detaching operations are circular and may be drilled, and in which the necessity for slots is eliminated.

A further object of the invention is the provision of a detachable chain structure in which the pintles are cylindrical in form and are free to turn in assembled position, in a manner to distribute wear uniformly thereon.

Still another object of the invention is the provision of a detachable chain structure which may be assembled and taken apart without the necessity of sliding the links with relation to the pins, and without the necessity of collapsing movement of the link members.

Other objects of the invention are such as will appear in the following disclosure of preferred embodiments of the invention of which—

Fig. 1 is a plan view showing one embodiment in assembled relation.

Fig. 2 is a side view of the form shown in Fig. 1.

Fig. 3 is an end view of the form shown in Figures 1 and 2 showing the links in position to be taken apart.

Fig. 4 is a side view of the links as shown in Fig. 3.

Fig. 5 is a plan view of another embodiment of the invention.

Referring to Figures 1 to 4, a pair of links 1 have formed on the ends thereof bosses 2. Holes are preferably drilled or otherwise formed through bosses 2 of such size as to form a snug sliding fit over the turned cylindrical ends 3 of pintles 4. Pintles 4 are centrally enlarged in diameter and are turned to a size sufficient to give ample bearing surface in the ends 6 of center or spacing links. Links 7 have ends 6 of similar shape at each end thereof, and a hole in each end is drilled or formed of such diameter as to give a snug sliding fit on the enlarged central portion of pintle 4.

The ends of links 1 are beveled at 8, and projecting members 9 formed integrally with, or secured to links 7 extend outwardly and have inner surfaces arranged to overlap beveled edges 8 in the manner shown. In the normal relative operating positions of links 1 and 7 the inner surfaces of members 9 will prevent links 1 from slipping off the ends 3 of pintles 4 although permitting a slight sidewise sliding movement thereof.

To assemble the chain, pintles 4 are inserted into the holes in ends 6 of links 7 in a manner to permit reduced ends 3 to project from the ends thereof. Links 1 are then turned with their edges at right angles to the edges of links 7, as shown in Figures 3 and 4 in which position the end edges of lugs 9 will be parallel to the sides of links 1. The holes in bosses 2 are then slid over the ends 3 of pintles 4 and the links are then straightened to the position shown in Figures 1 and 2, or until projections 9 overlap surfaces 8, in which positions the chain will be assembled and ready for use. To take the assembled chain apart, links 1 and 7 are rotated until lug 9 no longer overlaps beveled edge 8, in which position links 1 may be lifted off ends 3 of pintles 4.

It will be noted that the only movement necessary to put the links in position to be broken is a rotary movement, and no additional sliding movement is necessary. It will also be noted that the pintle functions simply as a pivot and the spacing and locking of links 1 is accomplished solely by links 7, while the links 1 hold the pintle in proper position. The pintle is free to rotate and does rotate as the chain passes around the driving sprockets, in this manner presenting new wearing surfaces of the pintle and distributing the wear over the surface thereof.

The ends 3 of pintles 4 may be extended as shown by the dotted lines if desired to assist in the carrying of flights or to perform other functions, and it will be understood that suitable lugs or projections may be added to the various links for this purpose.

Referring to Fig. 5, a different form of chain embodying the principles of the present invention is shown. Links 10 and 11 have formed on one end thereof bosses 12 which have holes formed therein to fit on turned ends 13 of pintles 14 with a snug sliding fit. On the other ends of links 10 and 11 are formed bosses 15 with holes formed therein which also fit on ends 13 with a snug sliding fit. Spacing members 16 fit over enlarged center portions of pintles 14 and operate to space the ends 15 of the links as shown. Members 16 may be formed integrally with or rigidly secured to pintles 14, or may be rotatable thereon, as desired. The links 10 and 11 are shaped in such manner that the ends 12 thereof fit on ends 13 of the pintles over the ends 15 of the preceding links, when the ends 15 thereof abut against spacers 16 on the succeeding pintles. Formed on each boss 12 is a beveled surface 17 similar to surface 8 on the form above described, and formed integrally with links 10 and 11 are projections 18 which overlap surfaces 17 and are similar to projections 9 above described, the functions and operation of lugs 9.

To assemble this form the ends 15 of links 10 and 11 are slipped on the pintles with the end edges of projections 18 substantially parallel to the side edges of the preceding links 10 and 11 and the links are then straightened when they will be locked in assembled position. When joining the last pair of links with the first pair to make the chain endless one link may have its end 12 sprung over the pintle, or if preferred a special connection may be provided. To take the chain apart, two pairs of links are positioned at right angles and the first break is made by springing end 12 of one link off its pintle. The chain may then be rapidly taken apart by positioning the last pair of links at right angles with the preceding pair in which position they may be lifted off. In order to assist springing of the last link into position when snug fits are used, a special pintle with a taper on the end of section 13 may be provided, over which the springing action may be easily started.

It will be noted that in this form of chain, the links may be broken or taken apart and assembled by simply positioning two sections of the chain at right angles to each other, rendering this form convenient to handle.

The diameter of spacers 16 may be such that when the chain passes over the sprockets, the spacers act as rollers and at the same time, if rigidly secured to or integral with the pintles, operate to turn the pintles to present new bearing or wearing surfaces of ends 13 in the holes of the links.

Having described preferred embodiments of the invention, what is desired to be secured by Letters Patent and claimed as new is:

1. A detachable chain comprising a single center link; a pair of side links spaced apart by said center link; a connecting pin for said links rotatable in each of said links; and a plurality of projections formed integrally on said center link, shaped to overlap the ends of said side links and comprising the sole means for retaining said side links on said pin in the operation of the chain.

2. A detachable chain embodying a plurality of sections each comprising a single link; connecting sections between said single link sections each made up of a pair of side links spaced apart by said center links; pins with enlarged central portions and reduced end portions connecting said sections and rotatable in each of said links; projecting lugs formed on said center links; and retaining surfaces on said side links overlapped by said projecting lugs in the operating positions of said sections in a manner to retain said side links on the reduced end portions of said connecting pins in the operation of said chain.

In testimony whereof, I affix my signature.

JESMOND T. NICHOLSON.